UNITED STATES PATENT OFFICE

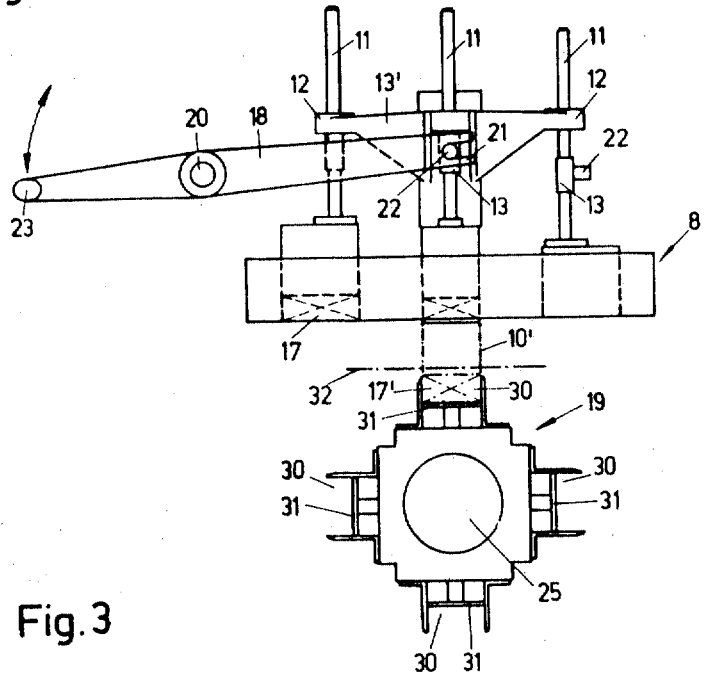
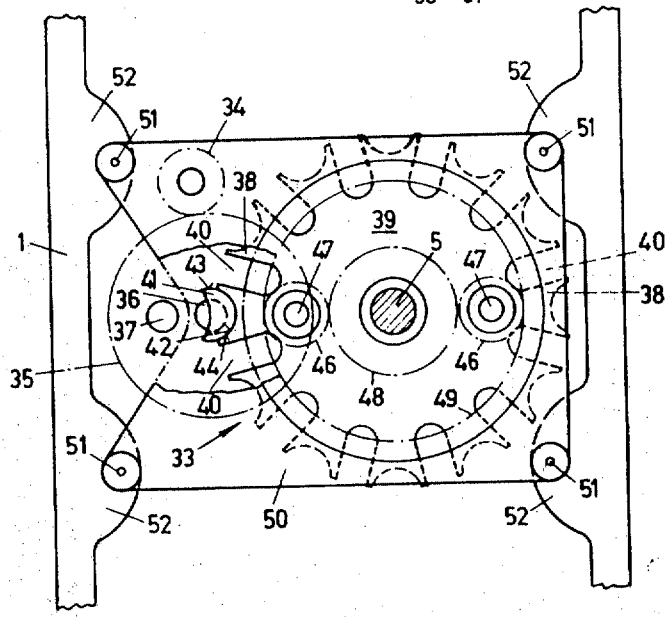

United States Patent Office 3,616,594
Patented Nov. 2, 1971

3,616,594
MACHINE FOR MOLDING AND WRAPPING BUTTER, MARGARINE, AND OTHER SUBSTANCES OF LIKE CONSISTENCY
Paul Graf, Schaffhausen, Switzerland, assignor to Schweizerische Industrie-Gesellschaft, Neuhausen am Rheinfall, Switzerland
Filed Aug. 28, 1969, Ser. No. 853,650
Claims priority, application Switzerland, Sept. 12, 1968, 13,627/68
Int. Cl. B65b 65/09
U.S. Cl. 53—122
8 Claims

ABSTRACT OF THE DISCLOSURE

The shafts of the mold and wrapping wheels are at right angles, drivingly connected together by bevel gears, and turned stepwise by a common stepping gear unit consisting of a Maltese-cross transmission and planetary gearing.

BACKGROUND OF THE INVENTION

The invention relates to a machine for molding and wrapping butter, margarine, and other substances of like consistency, and includes a mold wheel, turned stepwise, for molding the substances into solid blocks, a wrapping wheel, turned stepwise, having wrapping channels for accepting the blocks from the mold wheel together with a length of wrapping material to completely wrap the blocks.

Known machines of this kind have the disadvantage that they are relatively expensive, and despite their considerable size their parts are not easily accessible.

SUMMARY OF THE INVENTION

The machine of the invention represents a substantial improvement in both of these respects, because the shafts of the mold and wrapping wheels are set at right angles and a single stepping gear unit drives both shafts.

BRIEF DESCRIPTION OF THE DRAWINGS

The invention will be described, with reference to the figures of the accompanying drawings, wherein:
FIG. 2 is a view of certain parts of the machine, taken in the direction of the arrow II in FIG. 1;
FIG. 3 is a sectional view taken along line III—III of FIG. 1.

DESCRIPTION OF THE PREFERRED EMBODIMENT AND ITS MODIFICATION

Figure 1:
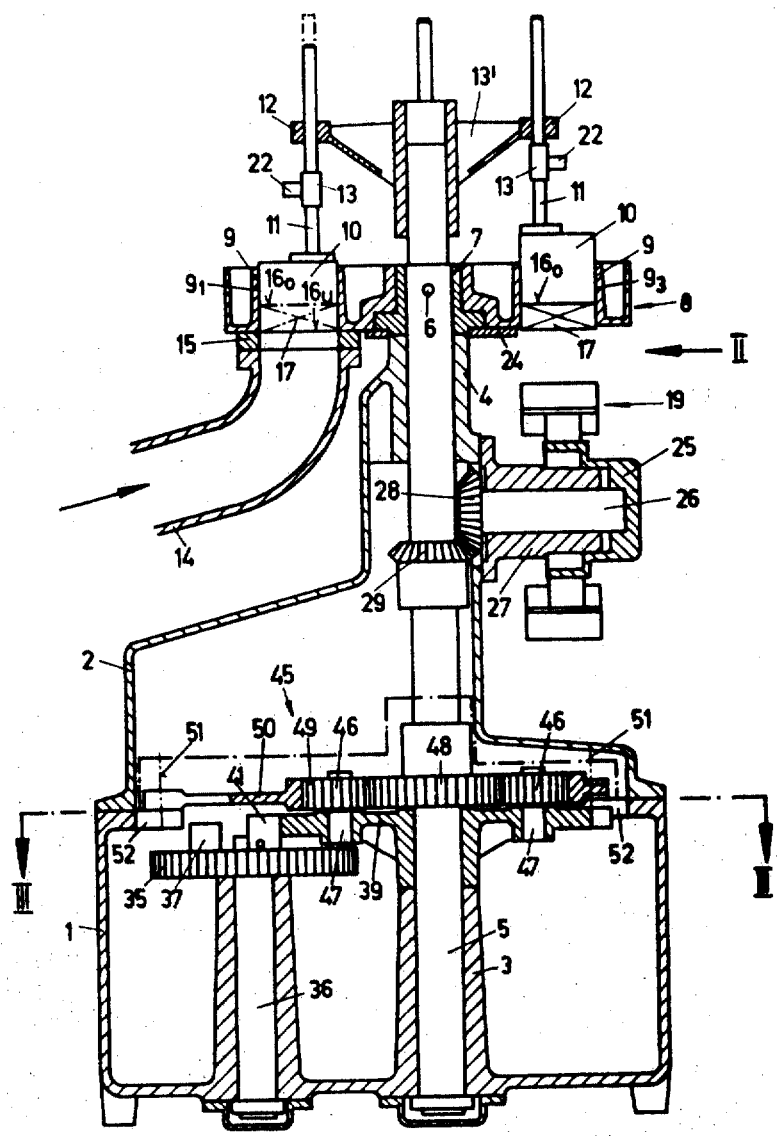
FIG. 1 is a vertical section through the machine.

The machine has a housing comprised of a lower part 1 and an upper part 2. The part 1 has a lower bearing 3 and the part 2 and upper bearing 4 for a vertical main shaft 5. Located immediately above the upper bearing 4 is a sleeve 7, which a pin 6 fixes to the shaft 5. The sleeve supports the shaft on the housing part 1 and carries a mold wheel 8 that is rigidly fixed to it. The mold wheel comprises four through openings, or molds, 9 that are spaced 90° apart, in the usual manner, along the wheel 8. These molds are square in cross section and used to shape the butter into parallelepiped blocks. A ram 10 of the same cross section as the mold is vertically movable in each mold 9. The ram rods 11 move each in a bearing 12 and carry a stop sleeve 13 for determining the height of the butter block. The vertical position of the sleeve can be made adjustable, if desired. A support 13', fixed to the upper end of the shaft 5, is provided along its periphery with the four bearings 12, which are spaced apart 90°.

A butter supply pipe 14, mounted on the housing part 1 in a manner not shown, opens into the mold 9 positioned above it. A conventional gasket arrangement 15 prevents the soft butter from escaping sideways. The butter can be pushed through the pipe 14 by, among other means, a conventional arrangement of two contrarotating screws (not shown) that squeeze the butter from a receptacle into the pipe 14.

In a manner to be explained, the main shaft is turned in 90° steps, so that the molds 9 are successively moved to the position 9' in which they are located above the outlet of the pipe 14. When a mold is in position 9' the front face 16 of its ram 10 is in its lowest position 16u. The pressure of the mass of butter forces the ram upwards until the stop sleeve 13 strikes the bearing 12, whereupon the ram face in its uppermost position $16_o$, shown in dot-dash line; and a block of button 17, represented by crossing diagonal lines, has been formed. After two 90° steps of the main shaft 5, the mold 9 of this block 17 is at position $9_3$, at which a level 18 (see FIG. 2) presses down the ram rod 11 and forces the block of butter 17 out of the mold 9 end to a wrapping wheel 19.

The lever 18, which is fixed to the housing at 20, has at one end a fork 21, which engages a lateral projection 22 of the stop sleeve 13 after the second 90° step of the shaft 5. Conventional means, not shown, first raise and then lower the other end 23 of the lever 18, so that the block of butter 17 is pushed out and the ram 10 then withdrawn into the mold 9. At the first and second 90° steps of the block 17 and at the third and fourth 90° steps of the ram 10, a plate 24, fixed to the housing, prevents the block under its own weight from falling out of the mold 9.

The hub 25 of the wrapping wheel 19 is fixed at its outer end to a horizontal shaft 26, which turns in a bearing 27 flanged to the housing upper part 2. The inner end of this shaft has a bevel gear 28 that meshes with a bevel gear 29 of the same size on the main shaft 5. The wrapping wheel 19 comprises in a known manner four open wrapping channels 30, spaced 90° apart. If desired, the bottoms 31 of these channels can be made adjustable to accommodate blocks 17 of different heights.

Holding means, not shown, stretch the wrapping material 32 (see FIG. 2) between the mold wheel 8 and the wrapping wheel 19. After the lever 18 has pushed the block 17 out of its mold, the block pulls the wrapping material out of the holding means; and the wrapping channel 30 receives the block, as indicated by the reference numerals 10' and 17' in FIG. 2. The material 32 consequently folds itself about the bottom and two side surfaces of the block 17'. After one or two 90° steps of the wrapping wheel 19, the block is completely wrapped in a known manner with the material 32, and after the second or third 90° step the wrapped block is led to an output conveyor, not shown.

The main shaft 5 is rotated stepwise by a stepping gear unit 33 (see FIGS. 1 and 3) driven by a pinion 34 powered by a motor (not shown) mounted within the housing lower part 1. The pinion 34 meshes with a gear wheel 35 that is fixed to the upper end of a vertical shaft 36. The gear 35 has a drive pin 37, which engages in the slots 40 between the teeth 38 of a star wheel 39. The gear 35 further incorporates a stop cam 41, which in the position shown in FIGS. 2 and 3 engages in a recess 42 of the particular tooth 38. The cam 41 and the recesses 42 have respective cylindrically arcuate surfaces 43 and 44 of the same radius, but the surface 43 extends over a somewhat greater arc than the surface 44, so that the star wheel 39 is locked against turning until the cam 41 leaves the recess 42 and the pin 37 simultaneously enters the next slot 40. The star wheel 39 is rotatably mounted on the main shaft 5, and rests on the upper end of the bearing 3. Since the illustrated star wheel 39 has twelve teeth 38, it is turned 30° by each complete revolution of the gear 35. Inasmuch as the main shaft 5 must make 90°, and not 30°, steps, planetary gearing 45 is provided between the Maltese-cross transmission 35 and 39 and the main shaft 5.

The planetary gearing 45 comprises two planet pinions 46, spaced 180° apart. The shafts 47 of these pinions turn in the star wheel 39, and the pinions themselves mesh with a sun wheel 48 mounted on the main shaft 5. The planet pinions 46 also mesh with an internally toothed ring gear 49, which is provided on a plate 50 fixed to the housing. This plate is screwed at 51 to inwardly extending projections 52 of the housing lower part 1. The diameters of the wheels 46 and 48 are so chosen that the sun wheel 48, and therefore the main shaft 5, turns three times as fast as the star wheel 39. Thus, each complete revolution of the gear 35 causes the main shaft to turn quickly through 90° and then to remain stationary for a period of time.

As against those known molding and wrapping machines that have a mold wheel and a wrapping wheel but are differently arranged and driven, the machine of the invention has important advantages. Only a single stepping gear unit 33 is provided for driving both the mold wheel 8 and the wrapping wheel 19, thereby saving space and reducing cost. Despite the very compact construction, the different bearings are well spaced apart and easily protected against dirt. The fact that the shafts 5 and 26, of the mold wheel 8 and the wrapping wheel 19, are at right angles ensures that these two wheels are very easily accessible and that the wrapping wheels is easily removed, replaced, or cleaned. Since the plane of the wrapping material 32 runs parallel to the shaft 26 of the wrapping wheel, the operation of the machine can be well observed. The stepping gear unit 33, consisting of the Maltese-cross transmission 35 and 39 and the planetary gearing 45, is compact, easily manufactured, and gives good acceleration with simple bearings for the shafts.

Figure 4:
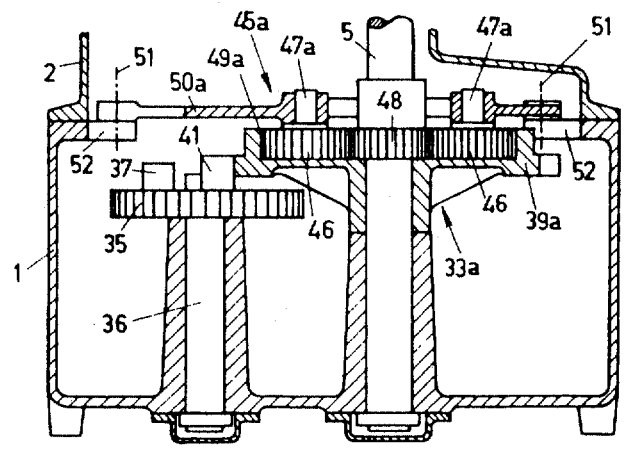
FIG. 4 is a vertical section corresponding to FIG. 1 of a modification of the stepping gear unit.

FIG. 4 shows a modified stepping gear unit 33a for a machine that is similar in all other respects. The unit 33a consists of a Maltese-cross transmission 35 and 39a and of planetary gearing 45. The internally toothed ring gear 49a is not provided on a plate (50 in FIG. 1) fixed to the housing but instead on the star wheel 39a. Consequently, the shafts 47a of the planet pinions 46 turn in the plate 50a fixed to the housing, instead of in the star wheel (39 in FIG. 1). The unit 33a operates in exactly the same way as does the unit 33.

The unit 33 or 33a can also be replaced by a star wheel unit having a similar acceleration curve, but the manufacture of such a unit is appreciably more complicated.

Although the preferred embodiment and its modification have been described, the scope of, and the breadth of protection afforded to, the invention are limited solely by the appended claims.

I claim:

1. A machine for molding and wrapping butter, margarine, and other substances of like consistency, including a stepwise rotatable mold wheel for molding the substance into solid blocks, a stepwise rotatable wrapping wheel, a plurality of wrapping channels comprised by said wrapping wheel for accepting the blocks from said mold wheel together with a length of wrapping material and for completely wrapping each block individually, and wherein the improvement comprises a horizontally disposed shaft (26) for rotating said wrapping wheel, a vertical shaft (5) for rotating said mold wheel, the axes of rotation of said shafts being arranged in a common plane and intersect each other at right angles, and a single stepping gear unit for driving both of said shafts and disposed in spaced relation from said wrapping wheel and said mold wheel and in a housing separate from said wrapping wheel and said mold wheel.

2. The machine as defined in claim 1, wherein said unit directly drives one of said two shafts, and including means for coupling the driven shaft to drive the other one of said two shafts.

3. The machine as defined in claim 2, wherein said mold wheel shaft is vertical and driven directly by said unit, said mold wheel is fixed to its said shaft, and said means are bevel gears for coupling together said two shafts.

4. The machine as defined in claim 1, wherein the plane of the wrapping material stretched in front of said wrapping wheel is parallel to said wrapping wheel shaft.

5. A machine for molding and wrapping butter, margarine, and other substances of like consistency, including a stepwise rotatable mold wheel for molding the substance into solid blocks, a stepwise rotatable wrapping wheel, a plurality of wrapping channels comprised by said wrapping wheel for accepting the blocks from said mold wheel together with a length of wrapping material and for completely wrapping each block individually, and wherein the improvement comprises a shaft (26) for rotating said wrapping wheel, a shaft (5) for rotating said mold wheel arranged at right angles to said wrapping wheel shaft, and a single stepping gear unit for driving both said shafts, said gear unit comprising a Maltese-cross transmission having a star wheel and a planetary gearing for multiplying the rotation of said star wheel.

6. A machine for molding and wrapping butter, margarine, and other substances of like consistency, including a stepwise rotatable mold wheel for molding the substance into solid blocks, a stepwise rotatable wrapping wheel, a plurality of wrapping channels comprised by said wrapping wheel for accepting the blocks from said mold wheel together with a length of wrapping material and for completely wrapping each block individually, and wherein the improvement comprises a shaft (26) for rotating said wrapping wheel, a shaft (5) for rotating said mold wheel arranged at right angles to said wrapping wheel shaft, and a single stepping gear unit for driving both said shafts, said gear unit comprising a Maltese-cross transmission having a star wheel and a planetary gearing for multiplying the rotation of said star wheel, said star wheel being rotatably mounted on said shaft which rotates said mold wheel, while the sun wheel of said planetary gearing is fixedly attached to said shaft which rotates said mold wheel.

7. A machine according to claim 5, including a housing for said Maltese-cross transmission and said planetary gearing, the latter including a plate (50) fixed to said housing, and an internally toothed ring gear (49) provided on said plate, and wherein the shafts of the planet pinions of said planetary gearing rotate in said star wheel, and the planet pinions mesh with said ring gear.

8. A machine according to claim 5, including a housing for said Maltese-cross transmission and said planetary gearing, the latter including a plate (50a) fixed to said housing, and an internally toothed ring gear (49a) provided on the star wheel (39a), and wherein the shafts of the planet pinions of said planetary gearing rotate in said plate, and the planet pinions mesh with said ring gear.

References Cited

UNITED STATES PATENTS

| | | | |
|---|---|---|---|
| 1,545,513 | 7/1925 | Peters et al. | 53—122 X |
| 3,048,922 | 8/1962 | Steinkemper et al. | 31—44 |

THERON E. CONDON, Primary Examiner

E. F. DESMOND, Assistant Examiner

U.S. Cl. X.R.

31—44